Sept. 5, 1939.    R. B. MILLARD    2,171,941
HEATING FURNACE STRUCTURE
Filed March 19, 1938    3 Sheets-Sheet 1
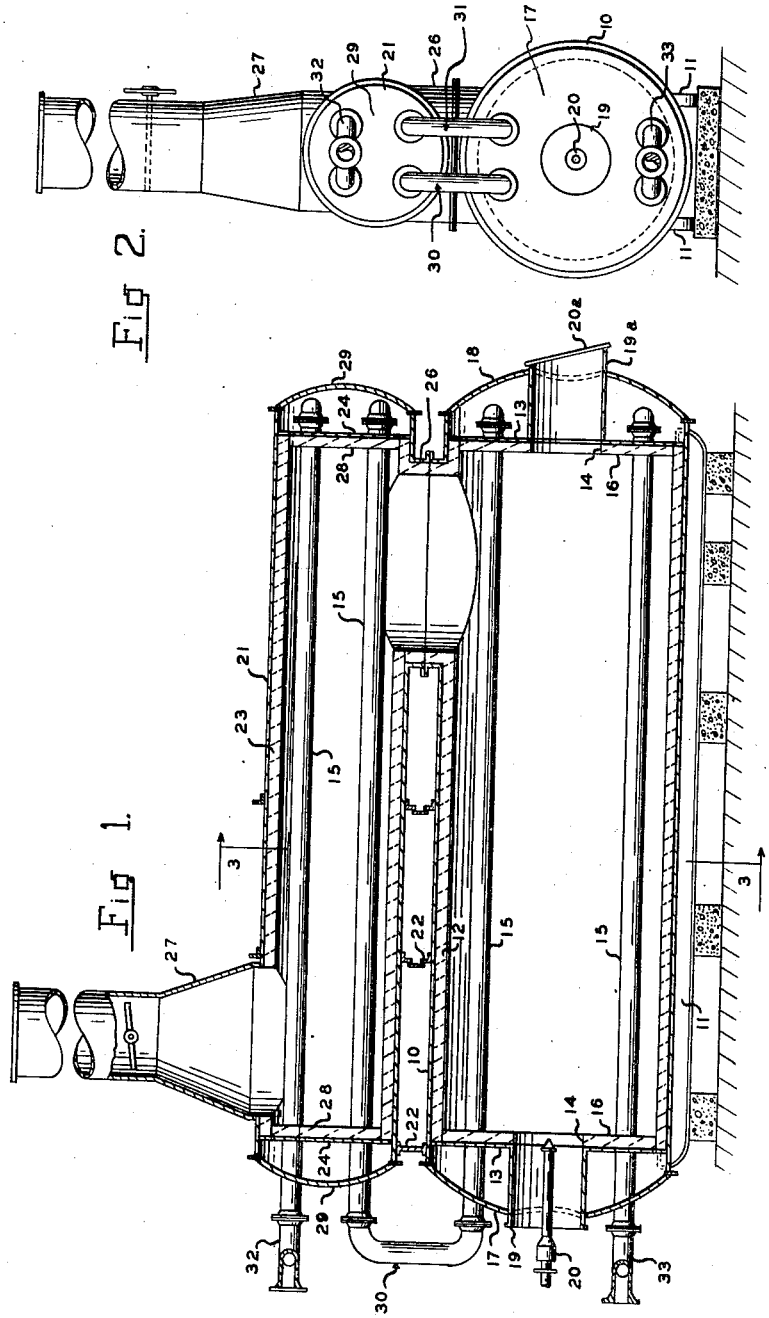
INVENTOR
R. B. MILLARD
BY
ATTORNEY Sept. 5, 1939.　　　　R. B. MILLARD　　　　2,171,941
HEATING FURNACE STRUCTURE
Filed March 19, 1938　　　3 Sheets-Sheet 2
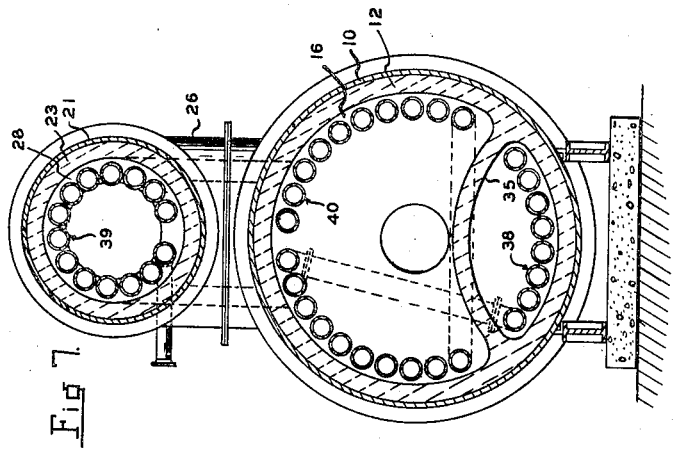
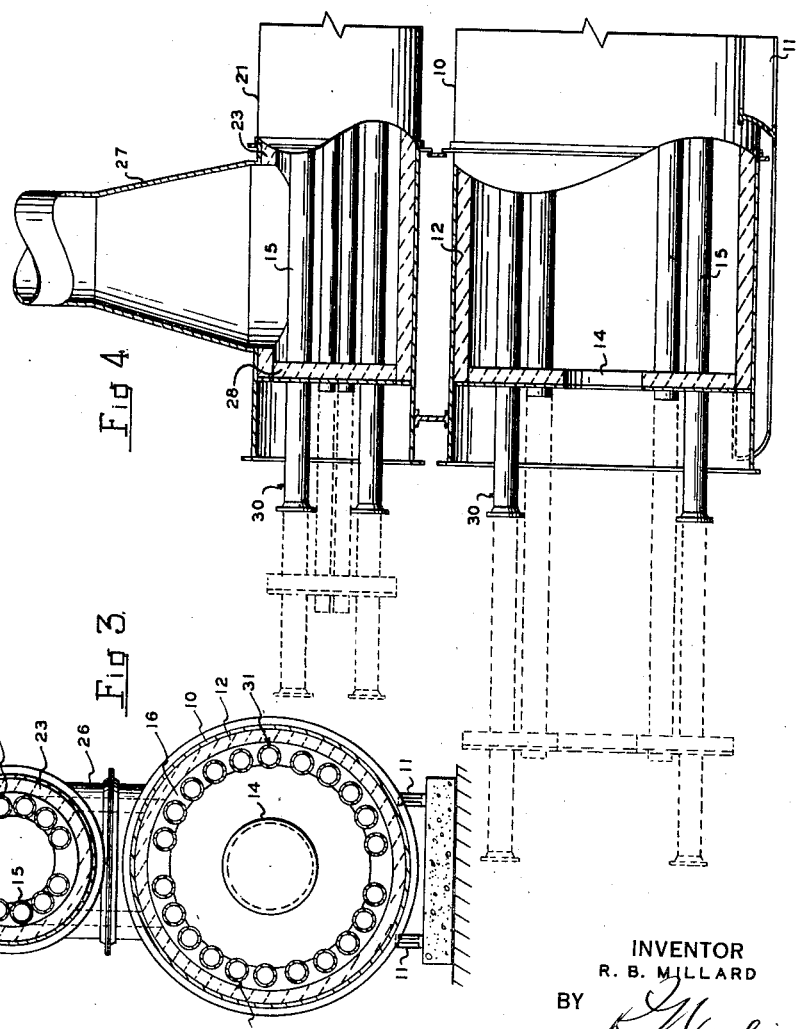
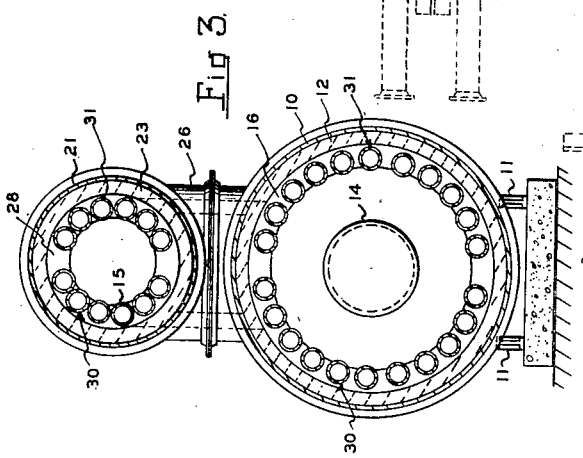
INVENTOR
R. B. MILLARD
BY
ATTORNEY Sept. 5, 1939.   R. B. MILLARD   2,171,941
HEATING FURNACE STRUCTURE
Filed March 19, 1938   3 Sheets-Sheet 3
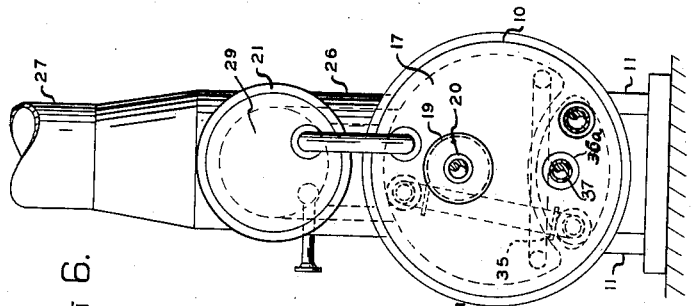
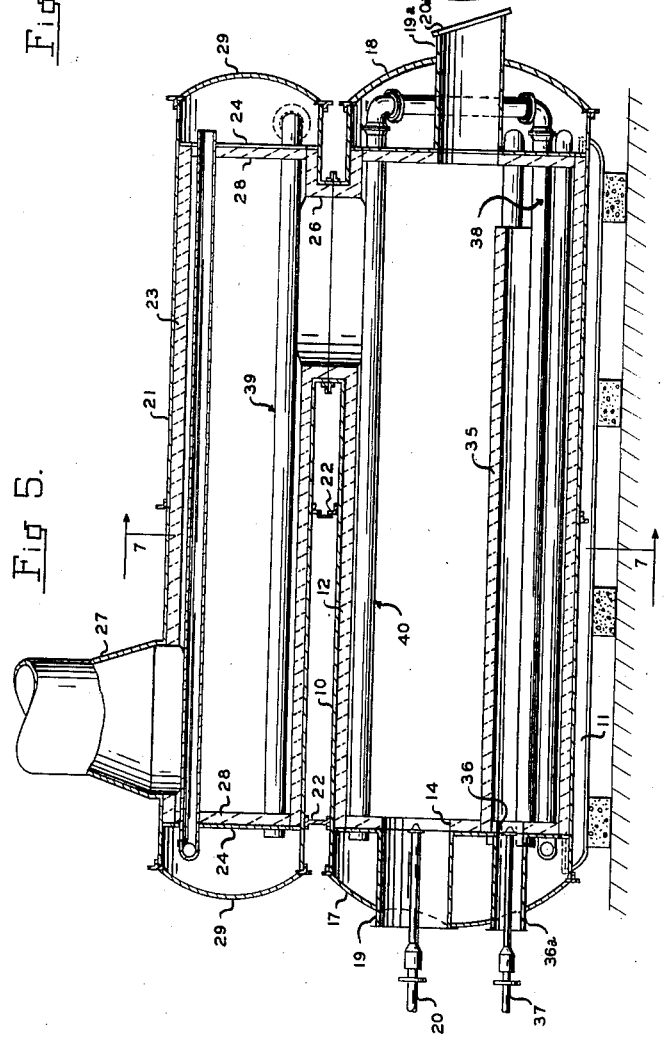
INVENTOR
R. B. MILLARD
BY
ATTORNEY Patented Sept. 5, 1939

2,171,941

UNITED STATES PATENT OFFICE 2,171,941

HEATING FURNACE STRUCTURE

Raymond B. Millard, Tulsa, Okla.

Application March 19, 1938, Serial No. 196,867

3 Claims. (Cl. 122—356)

This invention relates to heating furnaces and in particular to portable type furnaces having radiant heating and convection heating sections combined in a novel form of construction adapted to provide a compact, portable heating unit of high efficiency and of relatively low cost construction.

A particular object of this invention is to provide a furnace structure requiring a minimum amount of material for a maximum amount of strength and which may be constructed as a unit adapted to be easily transported from place to place wherever its services may be required.

Another object is to provide a portable type furnace structure comprising separate cylindrical radiant and convection heating chambers horizontally arranged in parallel relationship, one above the other, and having fluid conveying tubes annularly arranged in both said chambers and in efficient heat transfer relationship to heating gases, which are generated in the radiant heating chamber and caused to flow successively through said radiant and convection heating chambers.

A further object is to provide a furnace structure of the above general description having a plurality of tube banks which are removable bodily from the heating chambers.

Still another object is to provide furnace structures of the general type above described, having a novel arrangement of fluid conveying tubes therein to thereby provide improved fluid heating efficiency.

Numerous other important objects and advantages of the present invention will appear from the drawings and the following description.

In the drawings:

Fig. 1 is a vertical longitudinal section of a furnace structure in accordance with this invention.

Fig. 2 is a front elevation of the furnace structure of Fig. 1.

Fig. 3 is a vertical cross-section taken along line 3—3 of Fig. 1.

Fig. 4 is a detail of the structure of Fig. 1 showing in dotted lines, the partially withdrawn tube banks.

Fig. 5 is a vertical longitudinal section of another modification of furnace structure in accordance with this invention.

Fig. 6 is a front end elevation of the structure of Fig. 5, and

Fig. 7 is a vertical cross-section taken along line 7—7 of Fig. 5.

Referring to the drawings and more particularly to Figs. 1, 2, 3, and 4, a steel shell 10, preferably cylindrical in form, is supported in horizontal position on a pair of parallel skids 11—11, which are spaced apart and extend longitudinally beneath shell 10. The interior of shell 10 is lined with an annular refractory lining 12, which is preferably cast in place on the shell and becomes a permanent part thereof. Inwardly of the opposite ends of shell 10 are positioned circular tube plates 13—13 having central openings 14—14 and an annularly arranged row of openings to receive a plurality of fluid conveying tubes 15, which are thus annularly arranged about the interior of shell 10 and adjacent to lining 12. The inner faces of tube plates 13—13 are coated with refractory linings 16—16, which are cast on the tube plates and become more or less integral therewith. Linings 16—16 are adapted to slidably fit inside annular lining 12. Shell 10 is fitted at its front and rear ends with bumped heads 17 and 18 respectively. A sleeve member 19 is mounted centrally of head 17 and extends axially thereof into registration with opening 14 in the front tube plate 13, and a burner 20 is mounted in sleeve member 19. A sleeve member 19a is mounted centrally of head 18 and extends axially thereof into registration with opening 14 in the rear tube plate 13, and the outer end of sleeve member 19a is closed by an explosion door 20a.

A second steel shell 21, also preferably cylindrical in form, is supported in horizontal position on top of shell 10 and is spaced therefrom by spacer supports 22—22. Shell 21 also has an annular refractory lining 23 and circular tube plates 24—24 provided with annular rows of openings through which extend other horizontally disposed tubes 15, annularly arranged about the interior of shell 21 and adjacent to lining 23. A refractory lined heating gas duct connects shells 10 and 21 together near their rearward ends, while a stack 27 is mounted on top of shell 21 and communicates with the interior thereof near its forward end. The inner faces of tube plates 24—24 have refractory linings 28—28, and form closures for the ends of annular linings 23, with which the closures form a sliding connection. The ends of shell 21 are closed by bumped heads 29—29.

The tubes 15 on each side of the vertical center line of the furnace structure are connected together serially to form two parallel banks of tubes 30 and 31, which are respectively on the left-hand and right-hand sides of the center line. The uppermost tube of each of banks 30 and 31 in shell 21 are connected together at their front ends by means of a Y-connection 32, and the lowermost tube of each of these banks in shell 10 are also connected together at their front ends by means of a second Y-connection 33. By removing the Y-connections and the cross-over connections between the tube banks in shell 21 and those in shell 10, and by removing front heads 17 and 29, the entire groups of tubes, together with their supporting tube plates, in each of the shells, may be withdrawn bodily from their respective shells, as shown in Fig. 4, and the tubes thus made easily accessible for inspection or repair.

Fluid to be heated preferably enters the furnace through Y-connection 32, which divides the stream of fluid into two parallel streams in tube banks 30 and 31 which convey the streams of fluid through shell 21 in a generally downward direction and thence generally downward through shell 10 and out of the furnace through Y-connection 33, where the streams are re-combined.

Heating gases are generated by burner 20, as by burning oil, gas or other suitable fuel, and are introduced centrally of shell 10 through opening 14 in front tube plate 13. The gases flow generally longitudinally through shell 10, and by suitably controlling burner 20, these gases will be out of direct contact with the tubes 15 in shell 10, but will transfer heat to the fluid in the tubes largely by radiant heat from the luminescent gases of combustion in the forward portion of the interior of shell 10 and by convection heat in the rearward portion of this shell. The heating gases then flow from shell 10 through duct 26 into the rearward end of shell 21 and then longitudinally thereof to the forward end of shell 21, from which the gases escape finally through stack 27. The gases flowing through shell 21 will have been cooled to some extent in giving up heat to the fluid flowing through the tubes in shell 10, but will retain sufficient heat to at least partially heat or pre-heat the fluid entering the furnace through shell 21, this transfer of heat being largely by convection. Generally speaking, therefore, the relationship of the flow of fluid to that of the heating gases will be counter-current, the fluid becoming progressively hotter as it flows through the furnace, while the heating gases become progressively cooler. By means of the described parallel arrangement of the tube banks 30 and 31, a relatively large volume of fluid may be charged to the furnace, and the counter-current flow thereof relative to that of the gases results in very efficient heat transfer to the fluid with consequent high heating efficiency and good fuel economy.

By the above described arrangement of heating chambers, tube banks, and heating gas generation and flow, a very compact and efficient heating furnace is provided, which is very compact and serviceable in its construction and easily transportable on automobile trucks and trailers. A very convenient size which has proven very successful in actual use in oil fields, for example, has an over-all length of about 24 feet, an over-all height, exclusive of the stack, of about 11 feet and a maximum width of about 6 and one-half feet. This size, with the parallel tube bank arrangement above-described, has a heat input capacity of about 9,000,000 B. t. u. per hour, and will heat approximately 12,500 barrels per day of oil a total of approximately 200° F. It will be understood, of course, that arrangements of tubes other than that described may be used, while the sizes and numbers of tubes in each of the sections or banks may be varied widely.

Figs. 5, 6, and 7 illustrate another modification of the heating furnace of this invention. The general arrangement of the shells with their refractory linings, forming the heating chambers, is the same as in the first-described modification and the parts which are alike in both modifications are designated by like numbers.

In the new modification, shell 10 is divided into two compartments by a baffle 35, which extends across the lower portion of shell 10 and is connected to front tube plate lining 16 and extends longitudinally toward the rear end of shell 10 to a point forwardly of rear tube plate 13. Opening 14 in front tube sheet 13 is positioned above the longitudinal axis of shell 10 and sleeve member 19 and burner 20 moved upwardly in accordance therewith. A second opening 36 is provided in front tube plate 13 below baffle 35 and a registering sleeve member 36a housing a second burner 37 is mounted in head 17.

Baffle 35 segregates a group of the tubes 15 in the lower portion of shell 10 from the remainder of the tubes therein, and this segregated group of tubes will be referred to as the soaking bank and designated generally by numeral 38. The tubes in shell 21, now termed the preheater bank, will be generally designated by the numeral 39, while the remainder of the tubes in shell 10 will be termed the heating bank and designated generally by the numeral 40.

The flow of fluid through the furnace is initiated preferably through pre-heating bank 39, thence through heating bank 40 and finally through soaking bank 38, and is in general counter-current to the flow of heating gases through the furnace. Burner 20 supplies the main volume of heating gases, and, as in the first modification, heats the fluid in passage through heating bank 40 mainly by radiant heat and that in preheater bank 39 by convection heating. Burner 37 generates additional heating gases in the compartment of shell 10 below baffle 35 and supplies such additional heat to the fluid in soaking bank 38, and then escapes from the lower heating compartment through the passageway between the end of baffle 35 and rear tube plate 13, whence it joins the stream of heating gases generated by burner 20, with which they then flow through duct 26 thence through shell 21, transferring heat to the fluid in preheater bank 39, and then out of the furnace through stack 27.

This modified form of construction provides a highly efficient, portable, heating furnace which may be utilized for various fluid heating services, including oil cracking.

When used for oil cracking, the oil will be preheated in preheater bank 39, cracked in bank 40, and subjected to soaking temperatures in soaking bank 38, where additional heat may be supplied to the oil to maintain a desired decomposition temperature on the oil for an extended period of time.

If it is desired to use this form of furnace structure as a tubular steam generator, bank 38 may be utilized as a super-heater. Various combinations of flow arrangements through the several tube banks of the furnace may be utilized for oil heating or steam generation, or for the heating of fluids generally. Additional burners may be placed in shell 21 to supply added heat to the fluid passing therethrough. Either of the described modifications may be fired from both the front and rear ends, if desired, or by a row of burners pointed upwardly along the bottom of shell 10. Numerous other alterations and modifications may be made in the size, form and details of construction of the described furnace structures without departing from the scope of the appended claims.

What I claim and desire to secure by Letters Patent is:

1. In a portable heating furnace of the class described, a frame, a pair of parallel horizontally disposed cylindrical heating chambers mounted one above the other on said frame, a heating gas conduit providing communication between said chambers adjacent their rearward ends, a heating gas outlet communicating with the upper one of said chambers adjacent its forward end, a heating gas inlet communicating with the forward end of the lower one of said heating chambers, means for generating heating gases and introducing same axially of said lower chamber through said inlet, circular tube plates removably mounted at opposite ends of each of said chambers, a plurality of horizontally disposed heating tubes supported by said tube plates and annularly arranged within each of said chambers, the heating tubes in each of said chambers being serially connected to form separate tube banks in each chamber, each of said tube banks together with its supporting tube plates forming a unitary structure which is withdrawable bodily from the end of its respective chamber.

2. In a portable heating furnace of the class described, a frame, a pair of parallel horizontally disposed cylindrical heating chambers mounted one above the other on said frame, a partition member extending longitudinally of the lower one of said chambers from the forward end thereof and dividing said lower chamber into upper and lower compartments which are in communication at their rearward ends, separate banks of heating tubes in the upper one of said heating chambers and in said upper and lower compartments of the lower chamber, tube connections between said separate banks of tubes, means for separately introducing heating gases into the forward ends of said upper and lower compartments of the lower chamber, a heating gas conduit providing communication between the upper and lower heating chambers adjacent their rearward ends, and a heating gas outlet communicating with said upper heating chamber adjacent its forward end.

3. In a portable furnace of the class described, a pair of parallel horizontally disposed cylindrical heating chambers mounted one above the other, a conduit providing communication between said chambers adjacent their rearward ends, a stack communicating with the forward end of the upper one of said chambers, a plurality of horizonally disposed heating tubes annularly arranged within each of said chambers, the heating tubes in each chamber being serially connected on opposite sides of a vertical center line through the chambers to form two parallel banks of heating tubes in each of said chambers, tube connections from the tube banks in one chamber to the adjacent tube banks in the other chamber, a common fluid inlet connection to both banks in the upper chamber, a common fluid outlet connection from both banks in the other chamber, and means for introducing heating gases first into the lower chamber and second into the upper chamber.

RAYMOND B. MILLARD